United States Patent
Perez et al.

(10) Patent No.: US 11,025,722 B2
(45) Date of Patent: Jun. 1, 2021

(54) IOT DEVICE JOBS

(71) Applicant: Microsoft Technology Licensing, LLC, Redmond, WA (US)

(72) Inventors: Juan Perez, Redmond, WA (US); Affan Dar, Redmond, WA (US); Simon Porter, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 250 days.

(21) Appl. No.: 15/488,445

(22) Filed: Apr. 15, 2017

(65) Prior Publication Data
US 2018/0302476 A1    Oct. 18, 2018

(51) Int. Cl.
*G06F 9/48*      (2006.01)
*H04L 29/08*    (2006.01)

(52) U.S. Cl.
CPC .......... *H04L 67/125* (2013.01); *G06F 9/4881* (2013.01); *H04L 67/32* (2013.01)

(58) Field of Classification Search
CPC . H04L 67/12; H04L 67/1021; H04L 67/2804; H04L 12/2803; H04L 65/1073; H04L 67/1068; H04L 41/0893; H04L 67/125; H04L 67/10; H04L 67/1034; H04L 67/1095; H04L 69/40; H04L 41/042; H04L 41/065; H04L 67/142; H04L 67/325; G06F 11/1402; G06F 11/1484; G06F 11/2023; G06F 11/2025; G06F 9/442; G06F 11/2048; G06F 11/1438; G06F 16/1844; G06F 11/00; G06F 11/0709; G06F 11/1471; G06F 11/1658; G06F 11/2097; G06F 2009/4557; G06F 2009/45575; G06F 9/45558; G06F 9/5061; G06F 3/0482; G06F 9/4881; G06F 9/5066; G06F 11/1458; G06F 3/126;
(Continued)

(56) References Cited

U.S. PATENT DOCUMENTS 8,281,007 B2 * 10/2012 Goto .................. G06F 9/5033
                                                              709/225
9,693,356 B1 *  6/2017 Ren ...................... H04L 67/12
(Continued)

OTHER PUBLICATIONS

Schofield, Andrew, "Device Management is now live in IoT", https://www.ibm.com/blogs/bluemix/2015/08/iot-device-management-now-live/, Published on: Aug. 17, 2015, 13 pages.
(Continued)

*Primary Examiner* — Tonia L Dollinger
*Assistant Examiner* — Linh T. Nguyen
(74) *Attorney, Agent, or Firm* — Davin Chin; Chin IP, PLLC

(57) ABSTRACT

The disclosed technology is generally directed to communications in an IoT environment. In one example of the technology, device twins for corresponding IoT devices are stored, wherein the device twins include metadata that is associated with the corresponding IoT devices. A schedule job instruction may be received, and at least one candidate IoT device among the IoT devices that is associated with the schedule job instruction may be identified. In some examples, executors associated with the at least one candidate IoT device are created, and jobs are executed via the executors such that the executors are capable of resuming execution after at least one of an outage or a failure.

20 Claims, 6 Drawing Sheets

(58) Field of Classification Search
CPC .............. G06F 9/5027; G06F 11/3006; G06F 11/3017; G06F 16/2379; G05B 19/4183; G05B 2219/32404; G05B 2219/32406
USPC .......... 709/226, 203; 700/9; 718/1; 714/4.11
See application file for complete search history.

(56) References Cited

U.S. PATENT DOCUMENTS

| | | | | |
|---|---|---|---|---|
| 2004/0093351 | A1* | 5/2004 | Brochard | G06F 9/50 |
| 2004/0100971 | A1* | 5/2004 | Wray | H04L 12/437 |
| | | | | 370/400 |
| 2006/0053216 | A1* | 3/2006 | Deokar | G06F 9/5061 |
| | | | | 709/223 |
| 2006/0156273 | A1* | 7/2006 | Narayan | G06F 9/5044 |
| | | | | 717/100 |
| 2008/0141254 | A1* | 6/2008 | Lee | G06Q 10/0631 |
| | | | | 718/102 |
| 2013/0039166 | A1* | 2/2013 | Brown | H04L 41/0659 |
| | | | | 370/216 |
| 2014/0196054 | A1* | 7/2014 | Lee | G06Q 10/00 |
| | | | | 718/105 |
| 2014/0241354 | A1 | 8/2014 | Shuman et al. | |
| 2016/0055032 | A1* | 2/2016 | David | G06F 11/0793 |
| | | | | 718/107 |
| 2017/0005820 | A1 | 1/2017 | Zimmerman et al. | |
| 2017/0249215 | A1* | 8/2017 | Gandhi | G06F 11/1438 |
| 2018/0004568 | A1* | 1/2018 | Qiao | G06F 9/4818 |
| 2018/0011735 | A1* | 1/2018 | Singer | G06F 9/4881 |
| 2018/0143854 | A1* | 5/2018 | Kumar | G06F 9/50 |
| 2018/0183860 | A1* | 6/2018 | Majumdar | H04L 67/1002 |
| 2018/0246768 | A1* | 8/2018 | Palermo et al. | G06F 9/50 |

OTHER PUBLICATIONS

Zurcher, et al., "Overview of device management with IoT Hub", https://docs.microsoft.com/en-us/azure/iot-hub/iot-hub-device-management-overview, Published on: Mar. 9, 2017, 11 pages.

Perez, et al., "Schedule jobs on multiple devices", https://docs.microsoft.com/en-us/azure/iot-hub/iot-hub-devguide-jobs, Published on: Sep. 30, 2016, 9 pages.

"Device Management in WIoT Platform—Roll Back & Factory Reset", https://developer.ibm.com/recipes/tutorials/device-management-in-wiot-platform-roll-back-factory-reset/, Published on: Jul. 4, 2016, 29 pages.

Berdy, et al., "Understand and invoke direct methods from IoT Hub", https://docs.microsoft.com/en-us/azure/iot-hub/iot-hub-devguide-direct-methods, Published on: Jan. 11, 2017, 9 pages.

Caplow, et al., "IoT Device Management with Thingworx Utilities", https://www.ptcusercommunity.com/servlet/JiveServlet/previewBody/9172-102-1-13522/415_Caplow_20160620_1352.pdf, Published on: Jun. 8, 2016, 34 pages.

"Proximetry", http://proximetry.com/, Retrieved on: Mar. 10, 2017, 7 pages.

"Device Management", http://www.ptc.com/axeda/device-management, Retrieved on: Mar. 10, 2017, 3 pages.

"Nokia IMPACT (Intelligent Management Platform for All Connected Things) IoT Solutions", http://internet-of-things-innovation.com/wp-content/uploads/2016/06/IMPACT-solutions-sheet.pdf?utm_campaign=IoT+Email+Nurture+Campaign&utm_source=hs_automation&utm_medium=email&utm_content=31159006&_hsenc=p2ANqtz-9oL1BqKdgLBE_JY6EozHIG8ZihgrcLfHlkFCKvf9tSEVxGHp2luAycTQMUXib_Gk5HgorXXrVi0wJDgWi4nMSNmBVpcw&_hsmi=31159006, Retrieved on: Mar. 10, 2017, 3 pages.

"Device Management Console", https://www.particle.io/products/platform/device-management-console, Retrieved on: Mar. 10, 2017, 7 pages.

"NetWise IoT Services Platform", http://www.smithmicro.com/docs/default-source/brochures-datasheets/netwise-iot-platform-datasheet.pdf?sfvrsn=6, Retrieved on: Mar. 10, 2017, 2 pages.

"Connected Product Management: The Solution for Success in the IoT", https://az766929.vo.msecnd.net/document-library/xively/pdf/xively-datasheet-cpm-solution-brief-r1-april-2016.pdf, Retrieved on: Mar. 10, 2017, 3 pages.

Weber, John, "Fundamentals of IoT device management", http://iotdesign.embedded-computing.com/articles/fundamentals-of-iot-device-management/, Published on: Mar. 3, 2016, 15 pages.

\* cited by examiner

IOT DEVICE JOBS

BACKGROUND

The Internet of Things ("IoT") generally refers to a system of devices capable of communicating over a network. The devices can include everyday objects such as toasters, coffee machines, thermostat systems, washers, dryers, lamps, automobiles, and the like. The devices can also include sensors in buildings and factory machines, sensors and actuators in remote industrial systems, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to communications in an IoT environment. In one example of the technology, device twins for corresponding IoT devices are stored, wherein the device twins include metadata that is associated with the corresponding IoT devices. A schedule job instruction may be received, and at least one candidate IoT device among the IoT devices that is associated with the schedule job instruction may be identified. In some examples, executors associated with the at least one candidate IoT device are created, and jobs are executed via the executors such that the executors are capable of resuming execution after at least one of an outage or a failure.

An IoT solution service may provide IoT services for a set of IoT devices. The IoT solution service may store a corresponding device twin for each of these IoT devices. In some examples, each device twin includes metadata for its corresponding IoT device, and acts as a virtual representation of the corresponding IoT device.

A job can be used to update device twins at scale and/or invoke methods at scale. In some examples, a method is an interactive request-response pattern used to invoke a capability on a device, such as locking or unlocking a door, turning on or off a light, or the like. A job can be used to update device twins and or invoke methods on a schedule and track the progress of execution for a large number of devices.

Jobs may be initiated by schedule job instructions received from back-end applications. In some examples, when a schedule job instruction is received by the IoT solution service from a back-end application, the IoT solution service may identify candidate IoT devices, and then create an executor for each identified candidate IoT device. In some examples, each executor is independent and includes a durable state machine. In some examples, each executor independently executes in a durable way so that, if an outage or failure occurs, then afterwards, the executor can continue running from where the executor left off.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
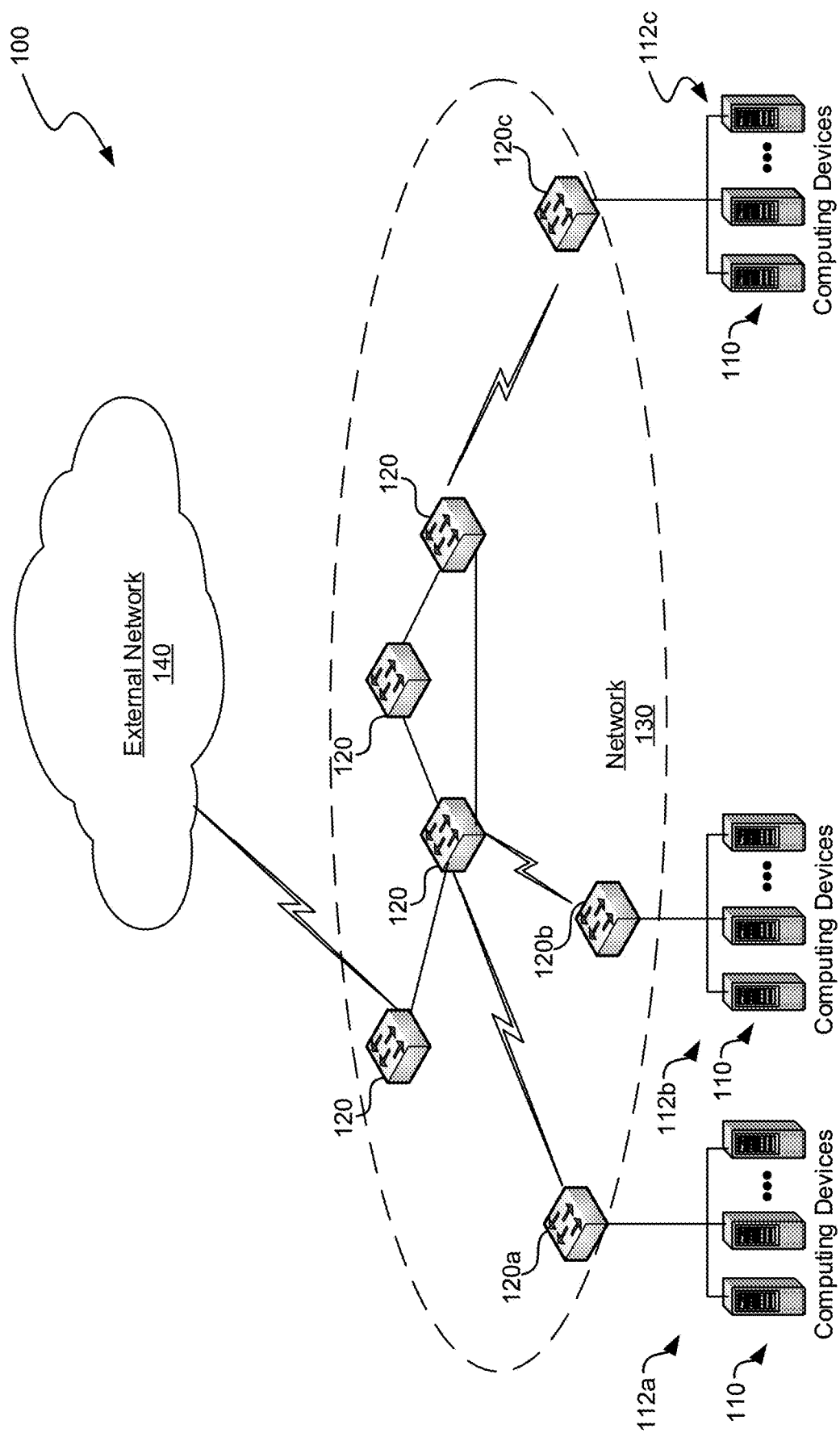
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. IoT data refers to data collected by and/or stored in IoT devices, including telemetry data and other types of data. A declarative request or declarative query is a request or query that is referentially transparent, meaning that the request is unchanged regardless of whether the input used is a reference or an actual value that the reference is pointing to. In essence, a declarative query specifies what information is being requested but does not specify how the query is to be answered.

Briefly stated, the disclosed technology is generally directed to communication in an IoT environment. In one example of the technology, device twins for corresponding IoT devices are stored, wherein the device twins include metadata that is associated with the corresponding IoT devices. A schedule job instruction may be received, and at least one candidate IoT device among the IoT devices that is associated with the schedule job instruction may be identified. In some examples, executors associated with the at least one candidate IoT device are created, and jobs are executed via the executors such that the executors are capable of resuming execution after at least one of an outage or a failure. An IoT solution service may provide IoT services for a set of IoT devices. The IoT solution service may store a corresponding device twin for each of these IoT devices. In some examples, each device twin includes metadata for its corresponding IoT device, and acts as a virtual representation of the corresponding IoT device.

A job can be used to update device twins at scale and/or invoke methods at scale. In some examples, a method is an interactive request-response pattern used to invoke a capability on a device, such as locking or unlocking a door, turning on or off a light, or the like. A job can be used to update device twins and or invoke methods on a schedule and track the progress of execution for a large number of devices.

Jobs may be initiated by schedule job instructions received from back-end applications. In some examples, when a schedule job instruction is received by the IoT solution service from a back-end application, the IoT solution service may identify candidate IoT devices, and then create an executor for each identified candidate IoT device. In some examples, each executor is independent and includes a durable state machine. In some examples, each executor independently executes in a durable way so that, if an outage or failure occurs, then afterwards, the executor can continue running from where the executor left off.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a gateway device, a device that comprises part or all of an IoT support service, a device comprising part or all of a cloud back-end, or the like, as discussed in greater detail below.

Illustrative Computing Device

Figure 2:
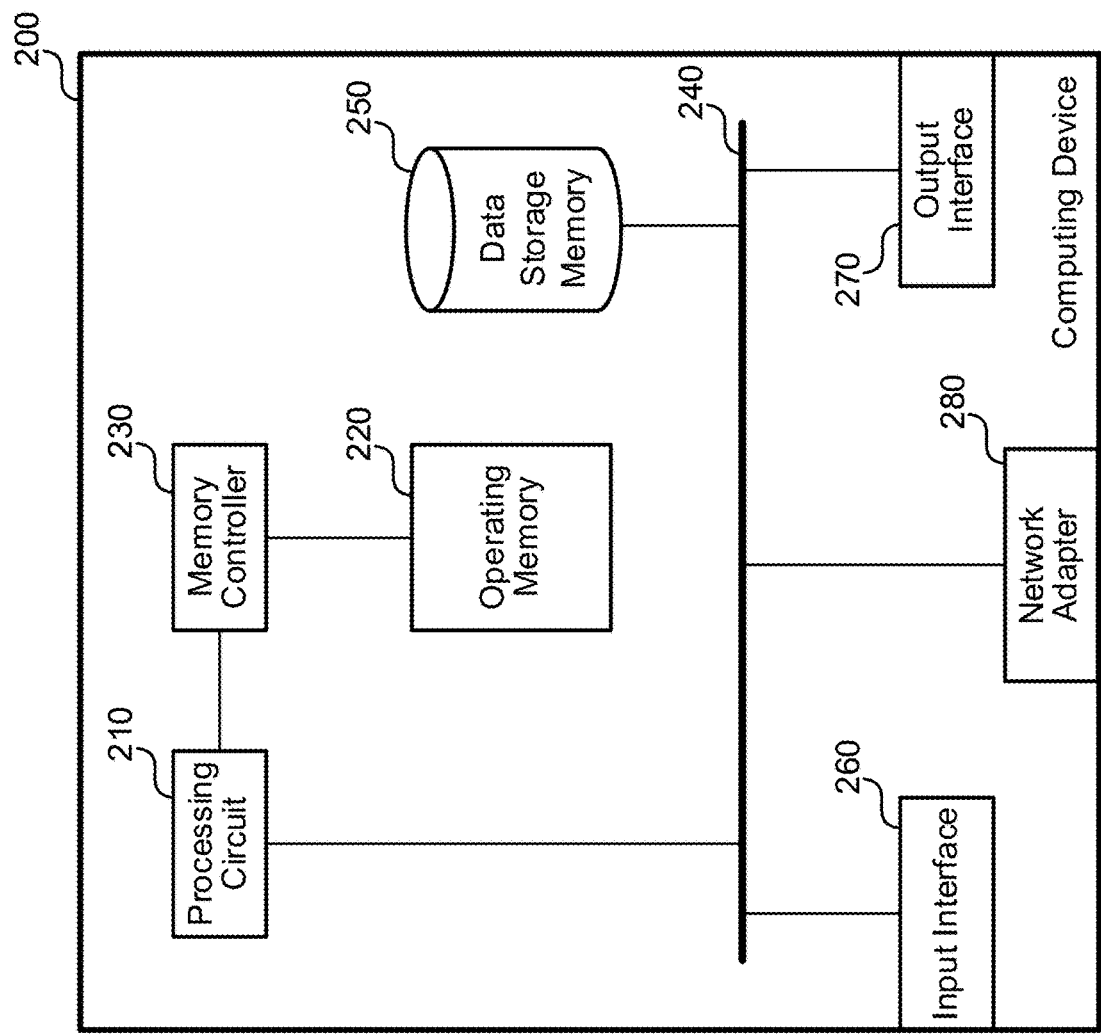
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, embedded device, programmable logic controller (PLC), or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is respectively adapted to execute processor-executable code that, in response to execution, enables computing device 200 to perform actions. In some examples, computing device 200 is enabled to perform actions such as the actions in the process of FIG. 5 and/or FIG. 6, or actions in a process performed by one or more of the computing devices in FIG. 2, 3, or 4 below.

Illustrative Systems

Figure 3:
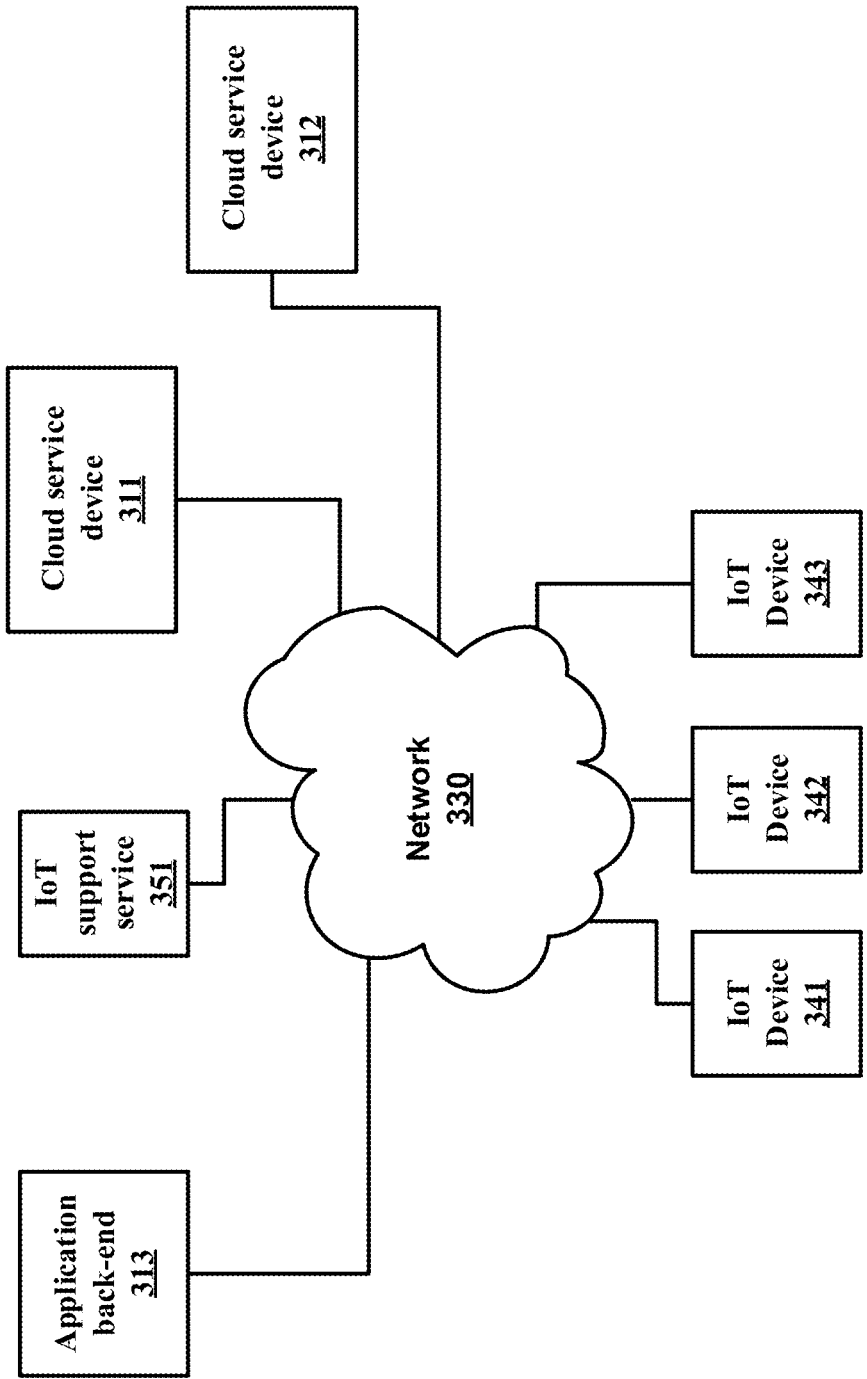
FIG. 3 is a block diagram illustrating an example of a system for IoT communications.

FIG. 3 is a block diagram illustrating an example of a system (300) for IoT data control. System 300 may include network 330, IoT support service 351, IoT devices 341-343, cloud service devices 311-312, and application back-end 313, which all connect to network 330.

The term "IoT device" refers to a device intended to make use of IoT services. An IoT device can include virtually any device that connects to a network to use IoT services, including for telemetry collection or any other purpose. IoT devices include any devices that can connect to a network to make use of IoT services. In various examples, IoT devices may communicate with a cloud, with peers or local system or a combination or peers and local systems and the cloud, or in any other suitable manner. IoT devices can include everyday objects such as toasters, coffee machines, thermostat systems, washers, dryers, lamps, automobiles, and the like. IoT devices may also include, for example, a variety of devices in a "smart" building including lights, temperature sensors, humidity sensors, occupancy sensors, and the like. The IoT services for the IoT devices can be used for device automation, data capture, providing alerts, personalization of settings, and numerous other applications.

The term "IoT support service" refers to a device, a portion of at least one device, or multiple devices such as a distributed system, to which, in some examples, IoT devices connect on the network for IoT services. In some examples, the IoT support service is an IoT hub. In some examples, the IoT hub is excluded, and IoT devices communicate with an application back-end, directly or through one or more intermediaries, without including an IoT hub, and a software component in the application back-end operates as the IoT support service. IoT devices receive IoT services via communication with the IoT support service. In some examples, an IoT support service may be embedded inside of a device, or in local infrastructure.

Application back-end 313 refers to a device, or multiple devices such as a distributed system, that performs actions that enable data collection, storage, and/or actions to be taken based on the IoT data, including user access and control, data analysis, data display, control of data storage, automatic actions taken based on the IoT data, and/or the like. Application back-end 313 could also be one or more virtual machines deployed in a public or a private cloud. In some examples, at least some of the actions taken by the application back-end may be performed by applications running in application back-end 313.

Each of the IoT devices 341-343, cloud service devices 311 and 312, and/or the devices that comprise IoT support service 351 and/or application back-end 313 may include examples of computing device 200 of FIG. 2. The term "IoT support service" is not limited to one particular type of IoT service, but refers to the device to which the IoT device communicates, after provisioning, for at least one IoT solution or IoT service. That is, the term "IoT support service," as used throughout the specification and the claims, is generic to any IoT solution. The term IoT support service simply refers to the portion of the IoT solution/IoT service to which provisioned IoT devices communicate. In some examples, communication between IoT devices and one or more application back-ends occur with an IoT support service as an intermediary. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. Some IoT devices may be connected to a user device via a different network in network 330 than other IoT devices. In essence, network 330 includes any communication method by which information may travel between IoT support service 351, IoT devices 341-343, cloud service devices 311 and 312, and application back-end 313. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

As one example, IoT devices 341-343 are devices that are intended to make use of IoT services provided by IoT support service 351. Cloud service devices 311 and 312 are devices that may be included in one or more external cloud services.

System 300 may include more or less devices than illustrated in FIG. 3, which is shown by way of example only.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 4:
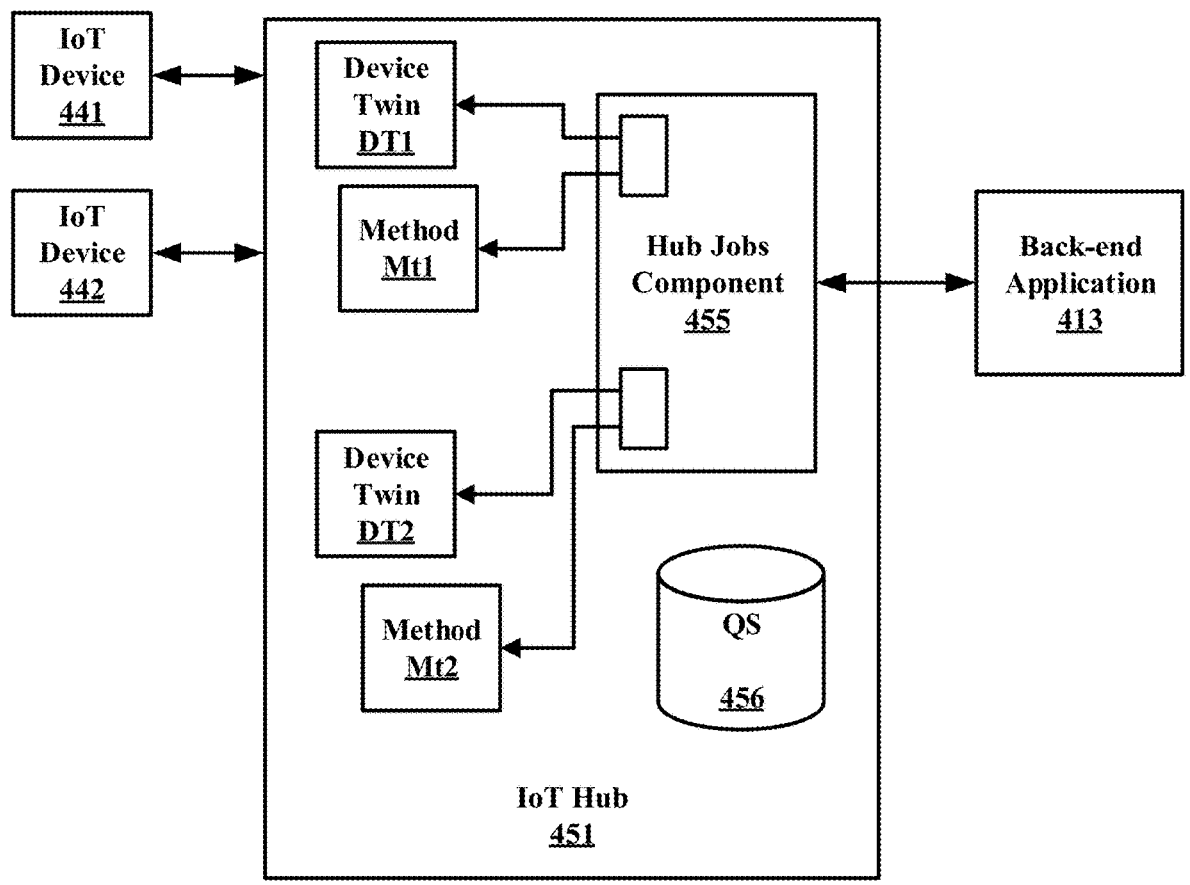
FIG. 4 is a block diagram illustrating an example of the system of FIG. 3.

FIG. 4 is a block diagram illustrating an example of a system (400) that may be employed as an example of system 300 of FIG. 3. In some examples, system 400 includes IoT hub 451, back-end application 413, and IoT devices 441 and 442. IoT hub 451 may include device twins DT1-DT2, methods Mt1-Mt2, hub jobs component 455, and query store (QS) 456.

An operator may use a back-end application, such as back-end application 413, to schedule jobs. The operator may cause back-end application 413 to send a schedule job instruction to IoT hub 451. In some examples, the operator will input a desired campaign, or the like, in some fashion to the back-end application, and the application will convert the information input by the operator into a schedule job instruction in a manner that will be understood by IoT hub 451.

Hub jobs component 455 may receive schedule job instructions, for example from one of more back-end applications such as back-end application 413. Hub jobs component 455 may include a job service (JS) (shown, e.g., in FIG. 5). In response to receiving the schedule job instruction, hub jobs component 455 may make a call to the JS, which may then instantiate a corresponding job in hub jobs component 455. The job may run immediately, or at a later time, based on a schedule indicated in the schedule job instruction. For example, a schedule job instruction may indicate a time of now for one or more aspects of a job, and may have a scheduled time for one or more aspects of the job. For example, the schedule job instruction may include instructions to ensure that all doors are locked this Sunday at 8 pm.

When the job in hub jobs component 455 runs, the job may identify candidate IoT devices associated with the received schedule job instruction. For example, a job schedule instruction may be an instruction to turn off all lights in a particular room at a particular time. Hub jobs component 455 may then identify which IoT devices are lights in the particular room. In some examples, hub jobs component 455 may identify the IoT devices by sending a query to QS 456, and receiving a response to the query from QS 456. QS 456 may include an index associated with the device twins (e.g., DT1-DT2). Devices may be identified in the schedule job instruction by any of several different criteria, including, for example, type of device, location of device, firmware version, and/or the like.

After identifying the candidate IoT devices, hub jobs component 455 may send scheduling commands to the device twin (e.g., DT1-DT2) of each corresponding candidate IoT device. In response to the received commands, each device twin (e.g., DT1-DT2) may create one or more device job actors. A device twin (DT) is interchangeably referred to as a device actor (DA) in this document. In some examples, each device job actor (DJA) is an independent executor that includes a durable state machine. In some examples, each DJA independently executes in a durable way so that, if an outage or failure occurs, then afterwards, the executor can continue running from where the executor left off. Each DJA may be part of hub jobs component 455.

In some examples, each DJA provides durable execution, which may include each DJA having an independent durable state machine, in which the code is broken up into several sub-activities, where each sub-activity will re-try until the sub-activity is successful, or the time-to-live (TIL) is reached, and where the current state is durably stored.

In some examples, each DJA performs a job in a durable manner. Jobs may include twin updates, twin queries, and/or method invocations. In some examples, twin queries are queries to device twins, such as a status query. For example, a job may include a query as to which locks in a particular location are locked. In some examples, a twin update is an update that alters the information stored in one or more device twins.

In some examples, a method (such as methods mt1-m3 above) is an interactive request-response pattern used to invoke a capability on a device, such as locking or unlocking a door, turning on or off a light, or the like. In some examples, a method is associated with a particular device twin. Each device twin may have one or more methods. Some methods may include a request to the IoT device that is associated with the device twin to which the method is associated. Some methods may instead or additionally include a request to some other device, such as a request to an external cloud service device (e.g., 311 of FIG. 3) of an external cloud service.

In some examples, a method is represented by a string that is sent to an IoT device or other device. For example, the method could be /reboot or /lockdoor or the like. In some examples, the particular device to which the method is sent to, as a request, acts on the string, and sends a response back to the device twin that sent the method string. For example, if, as part of a method invocation, /lockdoor is sent to an IoT device that is a smart lock, the smart lock may lock itself, and send back to the IoT device twin that the status of the lock is that the lock is locked. If an IoT device that is a smart light were to receive the method string /lockdoor as part of the method, the IoT device may respond back with an error indicating that the IoT device is not a type of device for which the string /lockdoor is appropriate.

Each DJA may operate on a schedule and track its own progress of execution, and includes durable storage such that resumption of the execution can continue where the execution left off if the execution is interrupted. During execution, some DJAs (e.g., those that involve a method that includes a request to an IoT device) may communicate with the corresponding IoT device.

In some examples, after a DJA has completed its job, the DJA may send an outcome to QS 456. The outcome may then be queryable from QS 456. In some examples, a job schedule instruction may include a TTL that the corresponding DJAs then also include. In some examples, if a DJA does not complete its job before the TTL ends, the DJA will stop executing and send an outcome indicating that expiration of the TTL occurred before the job completed to QS 456.

In some examples, each device twin may include at least tags and properties. In some examples, the properties may include reported properties and desired properties.

In some examples, reported properties indicate the properties of the corresponding devices as reported to the IoT hub. For example, for an IoT device that is a lock, the device twin may have a corresponding property indicating whether the reported status is locked or unlocked. In some examples, a desired property indicates the status that the property that the actual device should have at that time. In some examples, the desired property of a device in the device twin may be altered by a twin update. The desired property may be the same as or different than the reported property. If the desired property is different than the corresponding property, this difference may be taken into account for corrective action by a job that is currently executing, or may be reported as part of an outcome that may then possibly be dealt with by a subsequent job. In some examples, part of a schedule job instruction may include querying the outcomes after the TTL of a previous job has expired, and reporting the results back to application back-end 413.

Figure 5:
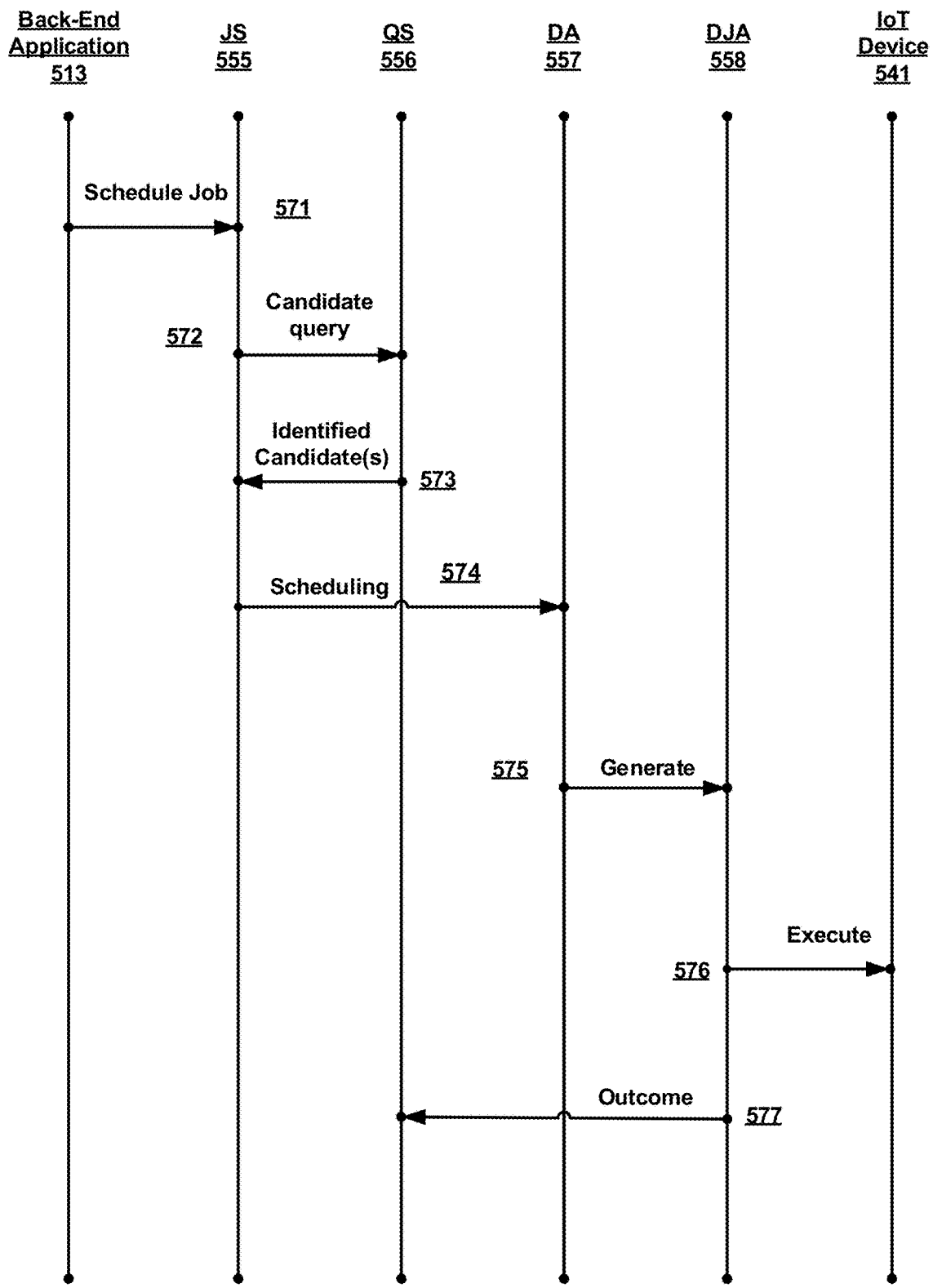
FIG. 5 is a diagram illustrating an example dataflow for a process for IoT communications.

FIG. 5 is a diagram illustrating an example dataflow (570) for a process for IoT communications. In some examples, dataflow 570 includes back-end application 513, job service (JS) 555, QS 556, DA 557, DJA 558, and IoT device 541. In some examples, JS 555, QS 556, DA 557, DJA 558 are part of an IoT hub.

In the illustrated example, first, step 571 occurs. At step 571, a schedule job instruction may be communicated from back-end application 513 to JS 555. As shown, step 572 occurs next in some examples. At step 572, JS 555 may communicate a query to QS 556 for an identification of candidate IoT device(s) associated with the job schedule instruction. As shown, step 573 occurs next in some examples. At step 573, the candidate IoT devices may be communicated from QS 556 to JS 555.

As shown, step 574 occurs next in some examples. At step 574, scheduling commands may be communicated from JS 555 to device actors DA 557. More specifically, for each identified candidate IoT device, a scheduling command may be communicated from JS 555 to the device actor that corresponding to the identified candidate device. As shown, step 575 occurs next in some examples. At step 575, in some examples, each DA 557 that received a scheduling command durably generates at least one DJA 558.

As shown, step 576 occurs next in some examples. At step 576, in some examples, each DJA 558 durably executes until completion of the job or until the TTL is reached. In various examples, the execution may include a device twin update, a device twin query, and/or a method invocation. A method communication may include a request to the corresponding IoT device 541 or to an external cloud service device of an external cloud service. In the specific example shown in FIG. 5, a method is invoked for the corresponding IoT device 541. As shown, step 577 occurs next in some examples. At step 577, an outcome may be communicated from each DJA 558 to QS 556.

When a method invocation is attempted, the corresponding IoT device may not be connected. In some examples, in that case, the method invocation will eventually happen as long as the IoT device connects prior to expiration of the TTL. So that, in these examples, during execution of a job, there are connected devices for which the method happens right away, disconnected devices that transition to connected prior to expiration of the TTL for which the device method happens upon connection, and devices that remain disconnected for the entire time interval, in which the method reaches an expired state. In some examples, for some jobs, such as a firmware updates, the IoT devices will inherently disconnect and reconnect during the process.

In some examples, jobs performed by the DJAs 558 may be smoothed out over time, particularly in the case of a large number of jobs. For example, if a large number of devices are to be rebooted at a particular exact time, JS may schedule the reboots so that the DJAs cause the reboots to occur evenly throughout a time window, such as 20 minutes, rather than attempting the reboots all at once.

Jobs may include several steps. For instance, in the case of a firmware update, steps could include, for example, download package, apply image, reboot, report state, and/or the like.

Figure 6:
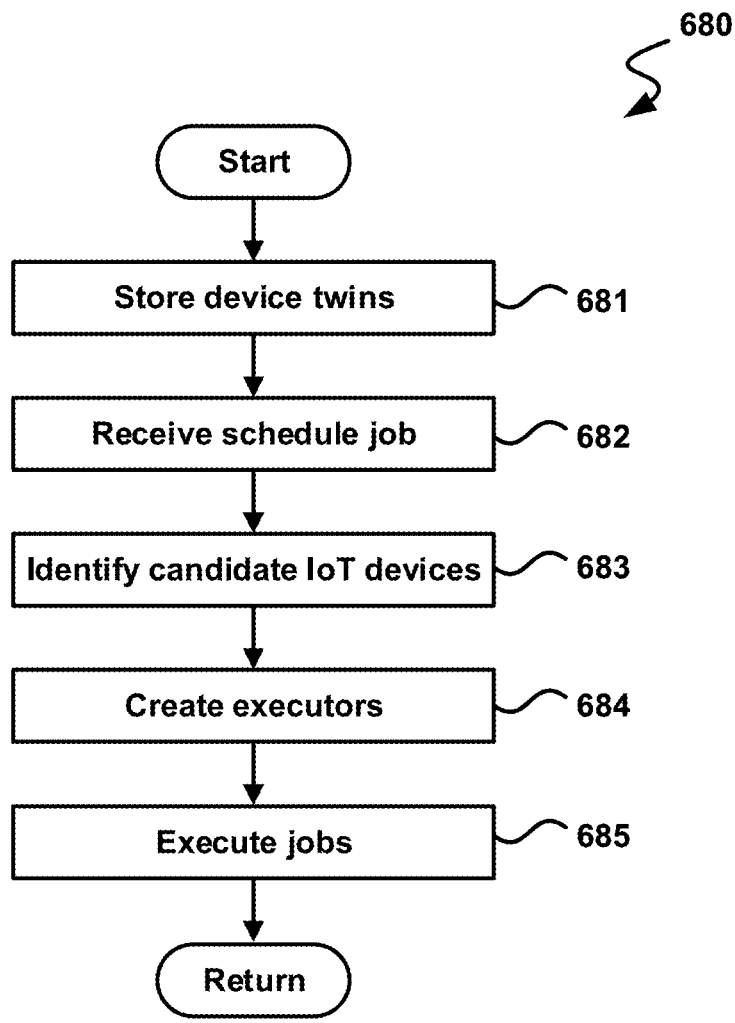
FIG. 6 is a diagram illustrating an example dataflow for a process for IoT communications, in accordance with aspects of the present disclosure.

FIG. 6 is a logical flow diagram illustrating an example of a process (680) for IoT communications. Some examples of the process are performed by an IoT solution service, such as an IoT hub, and/or the like. After a start block, the process proceeds to block 681. At block 681, device twins for corresponding IoT devices may be stored. In some examples, the device twins include metadata that is associated with the corresponding IoT devices. Block 682 occurs next in some examples. At block 682, a schedule job instruction may be received. Block 683 occurs next in some examples. At block 683, at least one candidate IoT device among the IoT devices that is associated with the schedule job instruction may be identified.

Block 684 occurs next in some examples. At block 684, in some examples, executors (e.g., device job actors) associated with the at least one candidate IoT device are created (e.g., generated), such that the executors include durable state machines. Block 685 occurs next in some examples. At block 685, in some examples, jobs are executed via the executors such that the executors are capable resuming execution after at least one of an outage or a failure, and such that the jobs include at least one of an update to at least one device twin, a query to at least one device twin, a request to at least one IoT device, or a request to at least one external cloud service. The process then proceeds to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. A method for Internet of Thing (IoT) communications, comprising:
    storing device twins for corresponding IoT devices, wherein the device twins include metadata that is associated with the corresponding IoT devices;
    receiving a schedule job instruction;
    identifying at least one candidate IoT device from amongst the IoT devices that are associated with the schedule job instruction;
    using at least one processor to create executors associated with the at least one candidate IoT device, such that the executors include durable state machines; and
    executing jobs via the executors such that the executors are capable of resuming execution after at least one of an outage or a failure of at least one of the executors, and such that the jobs include at least one of an update to at least one device twin, a query to at least one device twin, a request to at least one IoT device, or a request to at least one external cloud service, wherein executing the jobs includes performing at least a first sub-activity and re-trying the first sub-activity until the first sub-activity is successful or a time-to-live is reached, and wherein the durable state machines durably store a current state that is associated with the first sub-activity.

2. The method of claim 1, wherein the metadata includes, for the corresponding IoT devices: tags, reported properties, and desired properties.

3. The method of claim 1, further comprising:
sending outcomes via the executors.

4. The method of claim 1, further comprising:
in response to receiving the schedule job instruction, making a call to a job scheduler of an IoT support service.

5. The method of claim 4, further comprising:
the job scheduler sending scheduling commands to device twins corresponding to the identified candidate IoT devices.

6. The method of claim 4, further comprising:
in response to the call to the job scheduler, instantiating a job.

7. The method of claim 6, further comprising, after instantiating the job, running the job.

8. The method of claim 6, further comprising, after instantiating the job, running the job at a subsequent scheduled time.

9. The method of claim 1, further comprising:
sending scheduling commands to device twins corresponding to the identified candidate IoT devices.

10. The method of claim 9, wherein using the at least one processor to create the executors associated with the at least one candidate IoT device is accomplished via the device twins corresponding to the identified candidate IoT devices.

11. An apparatus for Internet of Things (IoT) communications, comprising:
a device including at least one memory adapted to store run-time data for the device, and at least one processor that is adapted to execute processor-executable code that, in response to execution, enables the device to perform actions, including:
storing device twins for corresponding IoT devices, wherein the device twins include metadata that is associated with the corresponding IoT devices;
receiving a schedule job instruction;
identifying at least one candidate IoT device from amongst the IoT devices that are associated with the schedule job instruction;
creating executors associated with the at least one candidate IoT device, such that the executors include durable state machines; and
executing jobs via the executors such that the executors are capable of resuming execution after at least one of an outage or a failure of at least one of the executors, and such that the jobs include at least one of an update to at least one device twin, a query to at least one device twin, a request to at least one IoT device, or a request to at least one external cloud service, wherein executing the jobs includes performing at least a first sub-activity and re-trying the first sub-activity until the first sub-activity is successful or a time-to-live is reached, and wherein the durable state machines durably store a current state that is associated with the first sub-activity.

12. The apparatus of claim 11, the actions further including:
sending scheduling commands to device twins corresponding to the identified candidate IoT devices.

13. The apparatus of claim 12, wherein at least one processor is further adapted such that creating the executors associated with the at least one candidate IoT device is accomplished via the device twins corresponding to the identified candidate IoT devices.

14. The apparatus of claim 11, the actions further including:
in response to receiving the schedule job instruction, making a call to a job scheduler of an IoT support service.

15. The apparatus of claim 14, the actions further including:
in response to the call to the job scheduler, instantiating a job.

16. A processor-readable storage medium, having stored thereon processor-executable code that, upon execution by at least one processor, enables actions, comprising:
generating device job actors associated with at least one IoT device, such that the device job actors include durable state machines; and
executing jobs via the device job actors such that the device job actors are capable of resuming execution after at least one of an outage or a failure of at least one of the device job actors, and such that the jobs include at least one of an update to at least one device twin, a query to at least one device twin, a request to at least one IoT device, or a request to at least one external cloud service, wherein executing the jobs includes performing at least a first sub-activity and re-trying the first sub-activity until the first sub-activity is successful or a time-to-live is reached, and wherein the durable state machines durably store a current state that is associated with the first sub-activity.

17. The processor-readable storage medium of claim 16, the actions further comprising:
sending scheduling commands to device twins corresponding to the at least one IoT devices.

18. The processor-readable storage medium of claim 17, wherein generating device job actors associated with at least one IoT device is accomplished via the device twins corresponding to the identified candidate IoT devices.

19. The processor-readable storage medium of claim 16, the actions further comprising:
receiving a schedule job instruction; and
identifying at least one candidate IoT device from amongst the IoT devices that are associated with the schedule job instruction such that the at least one IoT device is the identified at least one candidate IoT device.

20. The processor-readable storage medium of claim 19, the actions further comprising:
in response to receiving the schedule job instruction, making a call to a job scheduler of an IoT support service.

* * * * *